Figure 12:
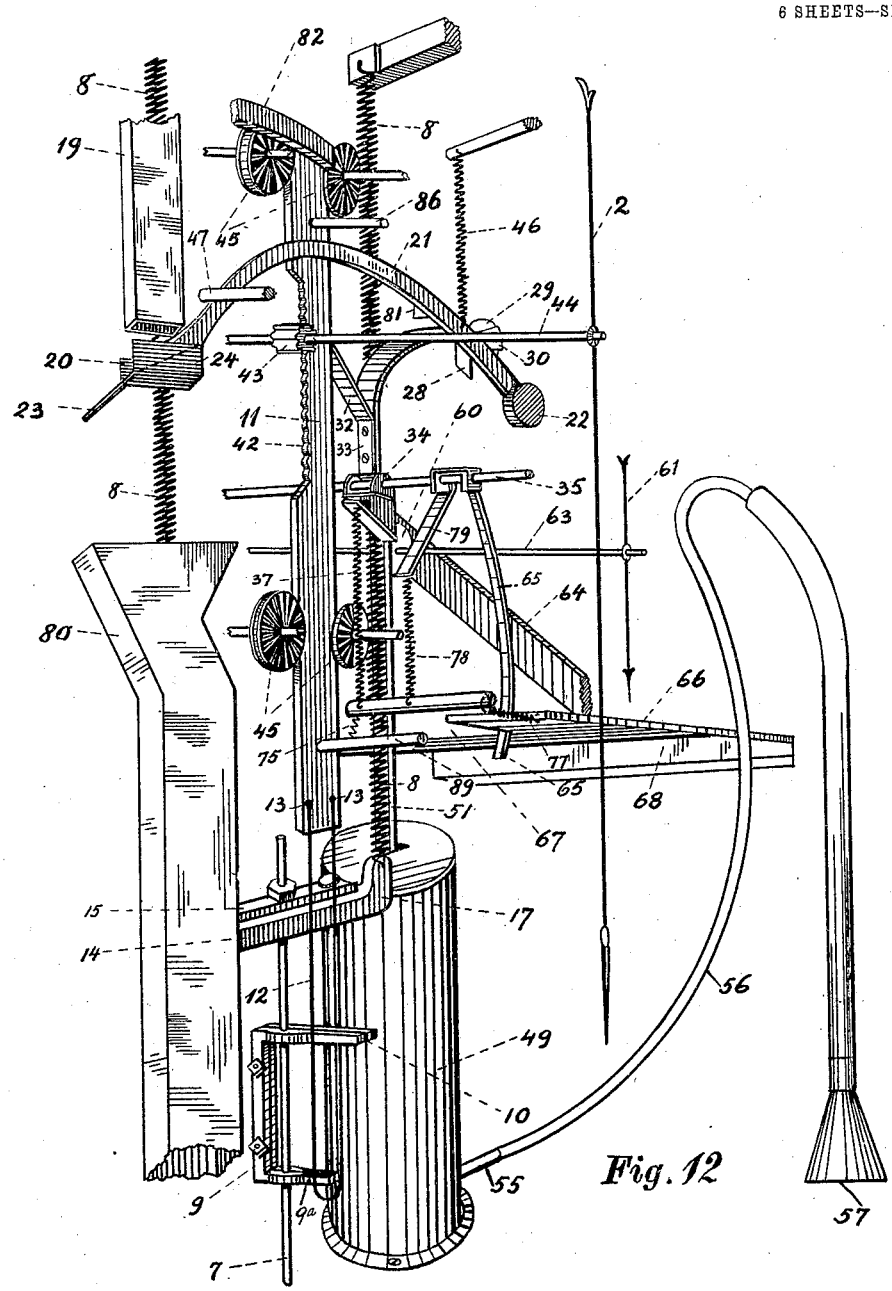

No. 820,543. PATENTED MAY 15, 1906.
E. A. BARTEZKI.
COIN CONTROLLED APPARATUS.
APPLICATION FILED FEB. 6, 1905.
6 SHEETS—SHEET 1
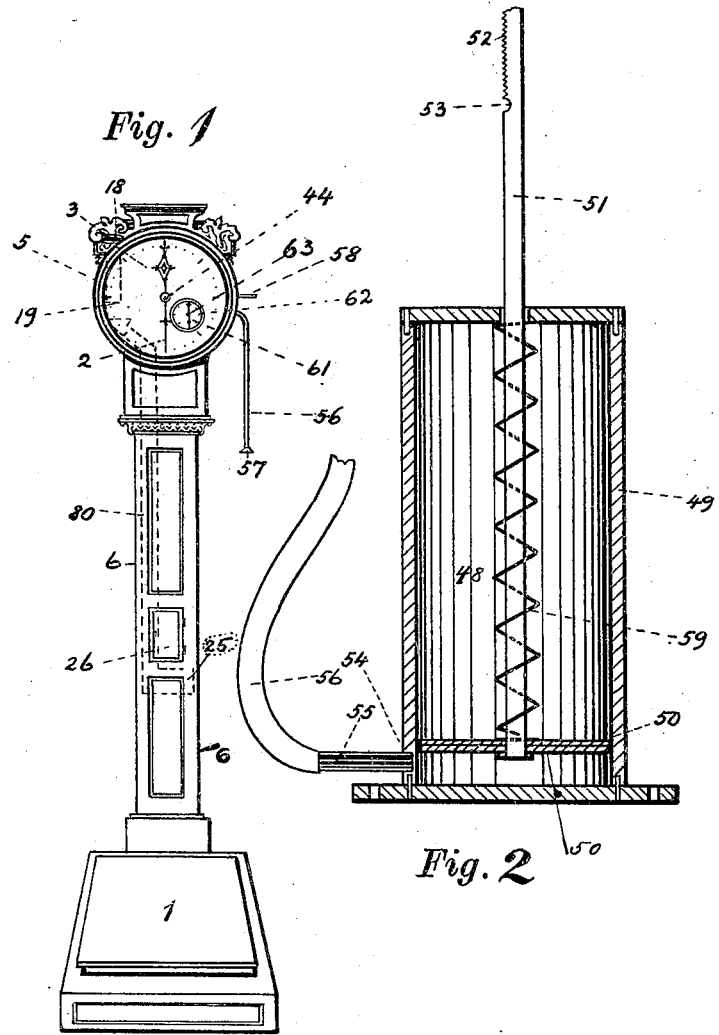
WITNESSES:
INVENTOR:
Emil A. Bartezki,
BY Hugh K. Wagner,
His ATTORNEY.

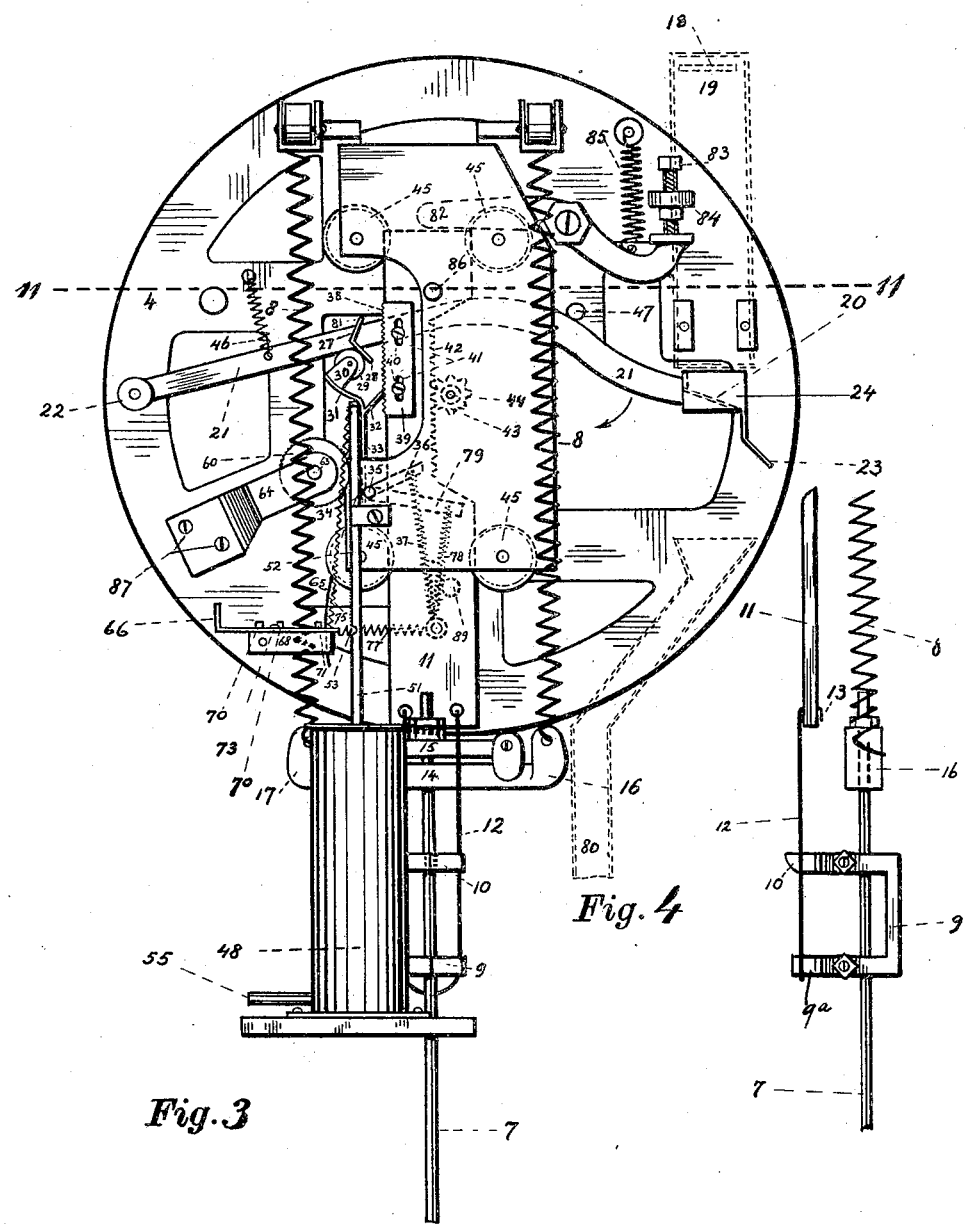

No. 820,543. PATENTED MAY 15, 1906.
E. A. BARTEZKI.
COIN CONTROLLED APPARATUS.
APPLICATION FILED FEB. 6, 1905.
6 SHEETS—SHEET 3.
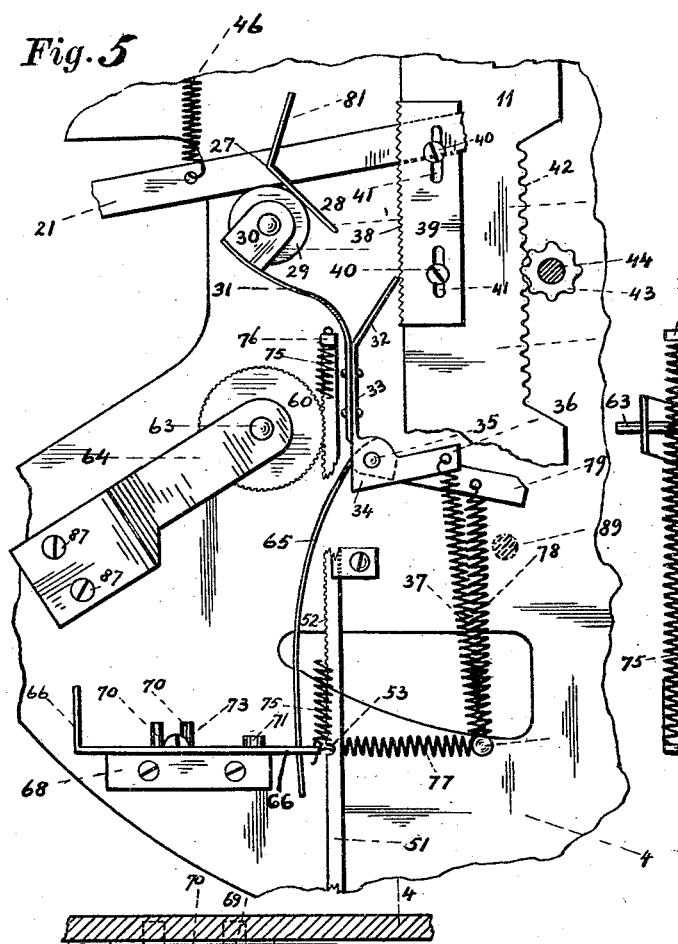
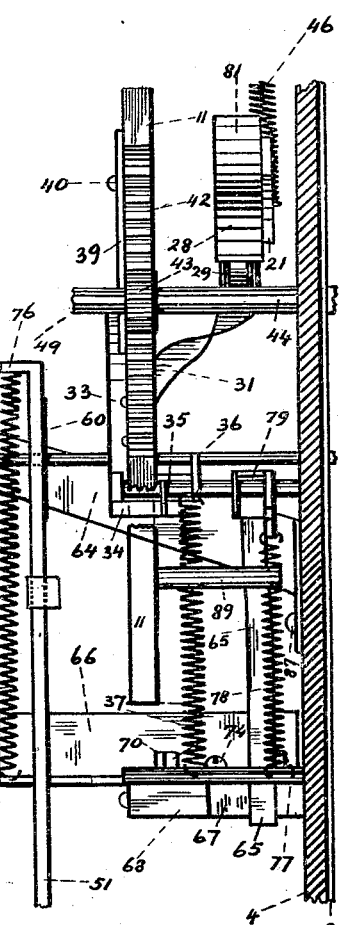
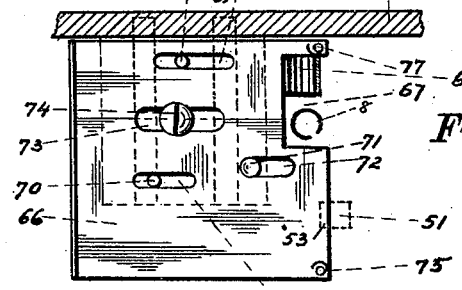
WITNESSES:
INVENTOR:
Emil A. Bartezki,
BY Hugh K. Wagner,
His ATTORNEY.

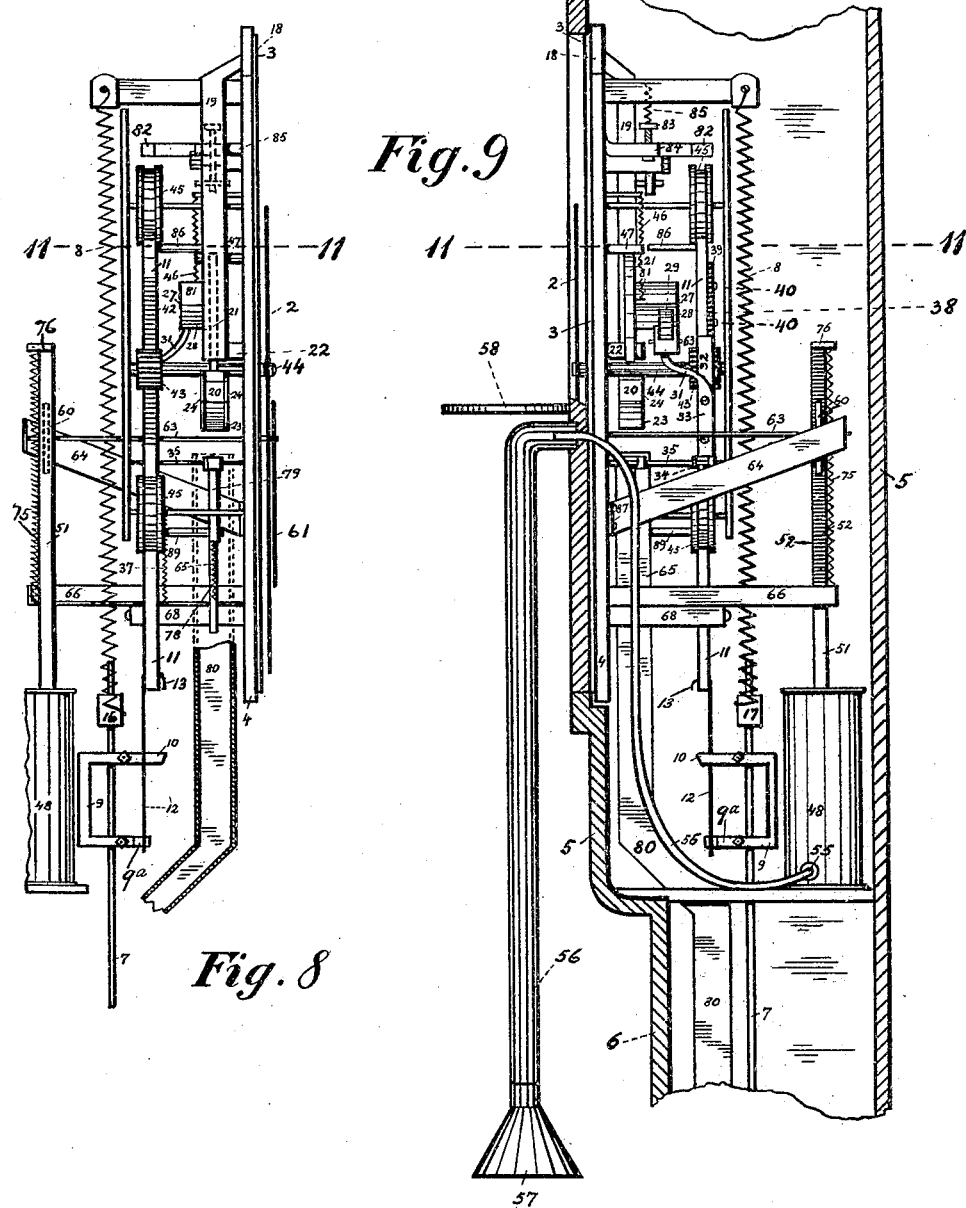

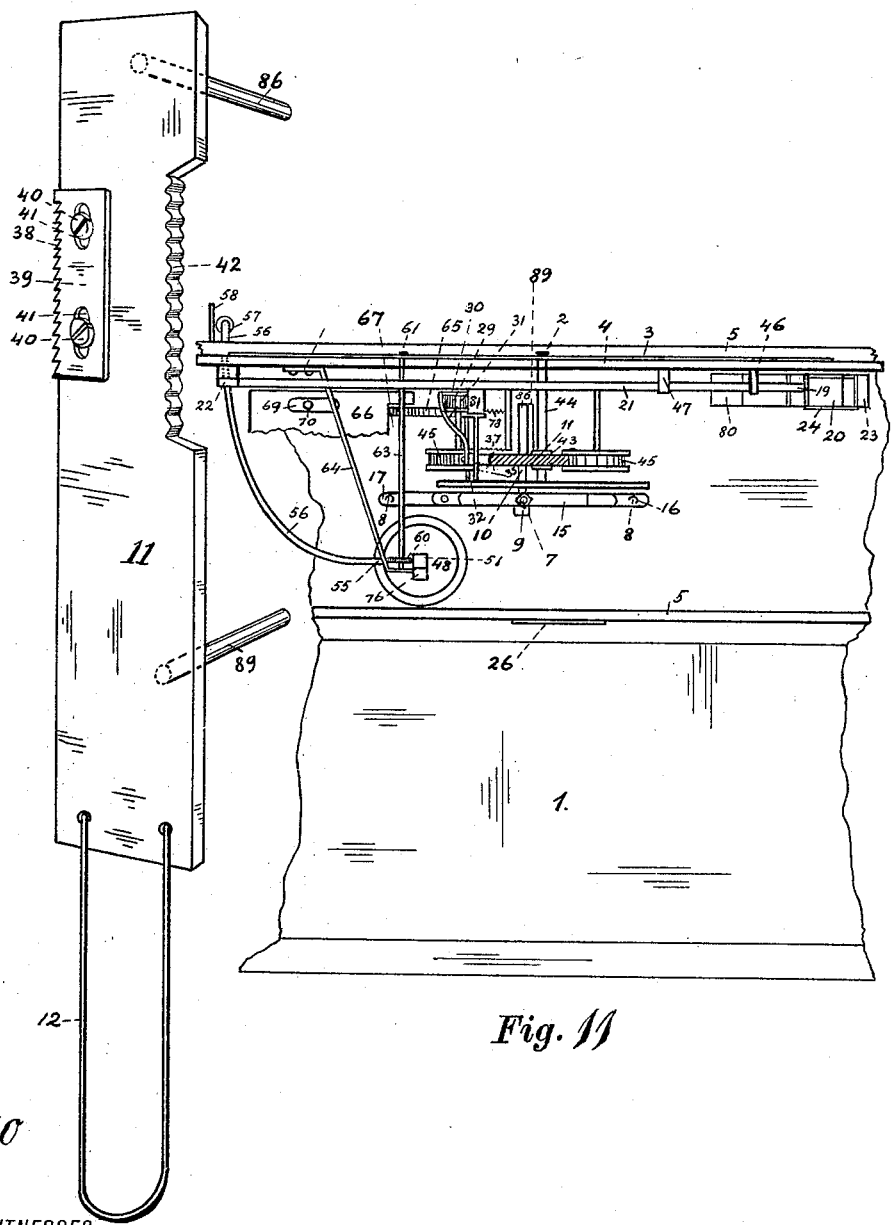

No. 820,543. PATENTED MAY 15, 1906.
E. A. BARTEZKI.
COIN CONTROLLED APPARATUS.
APPLICATION FILED FEB. 6, 1905.

6 SHEETS—SHEET 6.

WITNESSES: INVENTOR:
Emil A. Bartezki,
BY Hugh K. Wagner
His ATTORNEY

UNITED STATES PATENT OFFICE.

EMIL A. BARTEZKI, OF ST. LOUIS, MISSOURI, ASSIGNOR TO E. A. BARTEZKI AMUSEMENT COMPANY, OF ST. LOUIS, MISSOURI, A CORPORATION OF MISSOURI.

COIN-CONTROLLED APPARATUS.

No. 820,543.      Specification of Letters Patent.      Patented May 15, 1906.

Application filed February 6, 1905. Serial No. 244,291.

*To all whom it may concern:*

Be it known that I, EMIL A. BARTEZKI, a citizen of the United States, residing in the city of St. Louis and State of Missouri, have invented certain new and useful Improvements in Coin-Controlled Apparatuses, of which the following is a specification.

This invention relates to coin-controlled apparatus, and apart from the improvements in such apparatus hereinafter described provides especially for the control by means of the insertion of a single coin of two or more attachments.

In the accompanying drawings, forming part of this specification, in which like numbers of reference denote like parts wherever they occur, Figure 1 is a front elevation of a scale and lung-testing device combined. Fig. 2 is a sectional view, on an enlarged scale, through the lung-tester. Fig. 3 is a view, with the rear casing of the main dial removed, exhibiting the internal mechanism. Fig. 4 is a detail view showing the connection between the release mechanism and the weighing apparatus. Fig. 5 is a fragmentary view, on a large scale, of some of the parts exhibited in Fig. 3. Fig. 6 is a side elevation of the parts shown in Fig. 5 and on the same scale. Fig. 7 is a top plan view of the plate for locking the lung-tester from use. Fig. 8 is a side elevation of the interior mechanism looking toward the right in Fig. 3. Fig. 9 is a similar view looking toward the left in Fig. 3. Fig. 10 is a detail, on an enlarged scale, of the plate 11 and connected parts. Fig. 11 is a horizontal sectional view on the line 11 11, Figs. 3, 8, and 9; and Fig. 12 is a perspective view of the mechanism viewed with the dial-plate 3 removed.

The scale-plate 1 is mounted in the usual manner, and as the weighing operation is the same in this mechanism as in any other it has not been deemed necessary to illustrate the construction of the scale in detail. The indicator 2 on the dial-plate 3 shows the weight of the person who stands on the scale 1 after the release of the indicating mechanism, as hereinafter described. The dial-plate 3 is mounted upon the front wall 4 of the casing 5, which incloses the coin-controlling mechanism, said casing 5 being supported by the vertical standard 6, which is hollow and incloses the vertically-traveling rod 7, which in the ordinary way (not shown) connects the scale-plate 1 with the pair of springs 8, by which the weighing operation is performed.

When the customer stands on the plate 1, the depression of the plate 1, by means of the connections between same and the rod 7, draws the rod 7 downwardly and with it the fork 9, which is fixed to said rod 7, the upper prong or arm 10 of the fork projecting outwardly into the path of downward travel of the plate 11, from which depends the bent wire 12, attached to the plate 11 by the hooks 13, said wire 12 serving as a guide and a catch for the plate 11.

The downward movement of the rod 7 carries with it the pair of plates 14 and 15 borne thereby, having the pair of helical springs 8 attached to the lugs 16 and 17 at their ends. With the descent of the rod 7 the springs 8 become distended and the arm 10 is carried to such lower relative position as the degree of distention of the springs 8 allows. For this reason, when, as hereinafter described, the plate 11 descends, the degree of its travel is adjusted by the relative position of the arm 10, upon which the plate 11 rests when in its lowest position. Thus the plate 11 will travel farther in a downward direction when the greatest weight has been placed on the scale-plate 1 by reason of the fact that thereby the springs 8 will have been most distended, allowing the arm 10 to travel farthest downwardly. The plate 11, which governs the indication of the weight, does not descend, however, until a coin has been inserted through the slot 18 and descended through the chute 19 to the platform 20 on the end of the lever 21, pivoted at 22 to the plate 4. If the weight of the coin on the platform 20 does not depress the lever 21, the coin will roll to the extension 23, where it will exert a greater leverage to depress the lever 21 and insure its operation. The platform 20 is not horizontal, but inclined, as shown by the dotted lines in Fig. 3, and is provided with guards 24, which retain and direct the coin when it falls thereon, so that it will drop off of the platform 20 in only one predetermined direction or place, from whence it drops through the conveyer 80 to a box 25 adjacent to the door 26 in the standard 6, from whence it may be readily and conveniently removed.

When the lever 21 is depressed by the impact or weight of the coin, same moves downwardly in the direction indicated by the arrow in Fig. 3, which causes the angle-plate 27, rigidly fixed thereto, to rock so that its lower arm 28 impinges against the roller 29, which rides thereupon, said roller 29 being borne by the bracket or pair of brackets 30 on the arm 31 of an irregular-shaped fork, the other arm of which is numbered 32 and the stem 33. The stem 33 is connected to the rocking member 34, which is pivoted at 35 to the plate 4 and has extending therefrom in a direction approximately at right angles to the stem 33 the arm 36, to which is attached a spring 37, which normally holds the end of the arm 32 in engagement with the rack 38 on the plate 39, adjustably secured to the plate 11 by means of the set-screws 40, which pass through the slots 41 in the plate 39 and into the plate 11.

When the movement of the lever 21 causes the arm 28 to push upon the roller 29, the roller 29 and the arm 31, which carries same, are forced backwardly to such an extent that the connected arm 32 is forced out of engagement with the rack 38, whereupon the plate 11, by reason of its weight, immediately descends until stopped by the arm 10 of the fork 9, the relative position of said arm 10 depending upon the amount of weight resting upon the scale-plate 1 at that time. The rack 42 on the plate 11 engages the pinion 43, mounted on the shaft 44, which shaft 44 extends through the plate 4 and to the dial-plate 3 and has fixed thereto the indicator 2, which registers the weight on the scale-plate 1 upon the dial 3. It will be obvious, therefore, that as the location of the arm 10 depends upon the weight placed on the scale-plate 1 the plate 11 will cause only such degree of rotation of the pinion 43 as is allowed for by the degree of movement of the rack 42 in conjunction with the pinion 43, corresponding to the degree of downward movement of the plate 11 before it is stopped by the arm 10. When the plate 11 is stopped by the arm 10, the index 2 points to such weight on the dial 3 as corresponds to the degree of extension of the helical springs 8, which corresponds to the weight upon the scale-plate 1. In the operation just described the descent of the plate 11 is practically instantaneous after the arm 32 has been retracted from engagement with the rack 38, and as the teeth of the rack 38 point downward said arm 32 passes lightly over same when the travel of the rack 38 is in the opposite direction, said travel being due to the fact that the arm 10 pushes the plate 11 upwardly to its greatest height at the first rebound of the springs 8 after the weight is removed from the scale-plate 1, whereupon the rack 38 is caught by the arm 32 before it can again descend. The looped wire 12, catching on the arm 10, prevents the plate 11 from ascending higher than desired, and the pin 86 striking against the arm 82 also limits the upward travel of the plate 11. The plate 11 moves between two pairs of grooved rollers 45, which not only facilitate its passage, but also hold same in place and serve as guides. The spring 46 returns the lever 21 to its initial position as soon as the arm 32 has been disengaged from the rack 38, and the knob or pin 47 prevents its rising higher than is desired. The index-finger 2 will not operate until said arm 32 is disengaged from the rack 38, and said arm 32 cannot be so disengaged until a coin suitably inserted has tripped the lever 21.

Suitably arranged within or adjacent to the casing 5 is the lung-tester 48, comprising the cylinder 49, the piston 50, the piston-rod 51, having thereon the rack 52 and therein the notch 53. In the cylinder is the opening 54, entered by the pipe 55, to which is attached the piece of rubber tubing 56, terminating in the mouthpiece 57, which may, like the hand-phone of a telephone, be hung on the hook 58. The spring 59, coiled around the piston-rod 51, normally keeps the piston 50 in the position indicated in Fig. 2, but same can be caused to rise and push up with it the piston-rod 51 by pneumatic pressure underneath said piston caused by blowing in the mouthpiece 57. As the piston-rod 51 rises, by means of the rack 52 thereon, the toothed wheel or pinion 60 is rotated, and therewith the pointer 61 on the small dial 62, which may be located on the large dial 3. The shaft 63, on which the wheel 60 is mounted, also carries the pointer 61 and passes through the plate 4 as well as the dial-plate 3. The wheel 60 may be mounted in any desired manner; but it is depicted in the drawings as carried by the shaft 63, journaled in the plate 4, and also in the bracket 64, suitably attached to the front wall 4, as by means of screws 87, entering said plate 4. By this arrangement of a small dial 62 on the large dial 3 or in other suitable position on the face of the scale a convenient combination of two coin-controlled devices is produced, which increases the earning power of the machine. The value of this combination is enhanced by the arrangement about to be described, whereby the unlocking of the lung-tester for use is brought about by the introduction of the same coin that unlocks the weight-registering apparatus.

In rigid connection with the lever 79 is the arm 65, forming a bell-crank, pivoted on the pintle 35, which operates the means for preventing the piston-rod 51 of the lung-tester from rising to unlock the latter. In other words, the arm 65 releases and permits the operation of the lung-testing apparatus. The stud 89, borne by the plate 11, normally supports the lever 79, so as to keep arm 65 out of engagement with plate 66, the latter normally being seated in notch 53 and the arm 65 seating in the recess 67 in the plate 66 when pushing same out of notch 53. When the plate 11 descends, as hereinabove described, it carries stud 89 out of engagement with lever 79, which allows spring 78 immediately to exert its force on the bell-crank composed of lever 79 and arm 65, obviously causing arm 65 to push plate 66 out of notch 53, by which means the lung-tester is unlocked for use. When the weight is removed from the scale and the plate 11 again ascends, the stud 89 again retracts arm 65 from contact with plate 66 by lifting and holding lever 79 in its first position.

The plate 66 is supported by the bracket 68, fastened to the plate 4 in any suitable manner, and said plate 66 is provided with a plurality of slots 69, in which pins 70 serve to direct the longitudinal movement of the plate 66, while the pin 71 in the slot 72 limits the longitudinal movement of the plate 66 in either direction, and the set-screw 73, moving in slot 74, holds the plate 66 upon the bracket 68. When the arm 65 moves the plate 66 out of engagement with the notch 53 in the piston-rod 51, the plate 66 is so moved to the left, Figs. 5, 6, and 7, at which time the pin 71 is in the end of the slot 72, (indicated in Fig. 7,) which holds the lung-tester positively unlocked until it has been used or the plate 66 otherwise tripped over pin 71. It will be observed that the pins 70 are much taller than the pin 71. When the customer blows in the mouthpiece 57, as hereinabove described, and the piston 50 rises, the piston-rod 51 is elevated, which pulls with it the spring 75, attached to the arm 76, adjacent to the end of the piston-rod 51 and also to the inner edge of the plate 66. As the piston-rod rises, as just described, the spring 75 pulls the plate 66 back toward the piston-rod 51, in which movement it is assisted by the pull of the spring 77, which seats the plate 66 again in the notch 53, when the full backward movement of the plate 66 has occurred. When the plate 66 is in engagement with the notch 53, no amount of blowing into the lung-tester will cause the device to operate. When the plate 66 is out of engagement with said notch, the rising of the piston-rod 51, by means of the spring 75, with the assistance of spring 77, tends to restore the plate 66 into engagement with the notch 53. If the plate 66 on its return from its outward position strikes any portion of said rack below the notch 53 itself, said plate 66 easily slides as the piston-rod 51 descends until it seats in notch 53.

The operation of the machine is as follows: When the coin is inserted in the slot 18, it slides down the chute 19 until it contacts with the platform 20, whereupon the lever 21 is actuated. Sometimes it may happen that said lever is not actuated until the coin slides off upon the arm 23, after which the coin falls down the conveyer 80 until it reaches the box 25 adjacent to the door 26. When the lever 21 descends, the arm 28 of the angle-plate 27 pushes against the roller 29, and thereby forces the arm 31 backward, and thus the arm 32 out of engagement with the rack-bar 38. Sometimes when the person does not stand still on the scale the pointer 2 will not come to equilibrium to indicate the weight on the dial 3, while the arm 32 is disengaged from the rack 38 when the lever 21 is depressed by the insertion of the coin. Under such circumstances the roller 29 will ride over the angle of the angle-plate 27 and upon the arm 81. The spring 46 normally tends to draw the lever 21 upward, and this causes the roller 29 to ride back to the arm 28 of the angle-plate 27, and while passing said angle the arm 32 is a second time retracted from engagement with the rack 38, which allows the plate 11 to adjust itself with relation to the actual weight of the person on the scale-plate 1, thus actuating the pinion 43 by means of the rack 42, and thus the person has a second opportunity to ascertain his correct weight in such cases where he misses his first chance by not standing still on the scale-plate 1. When the arm 32 is disengaged from the rack 38, as just described, the plate 11 descends until it rests upon the arm 10. The arm 10 is movable with the rod 7, and the rod 7 being connected to the scale-plate 1 the weight of the person on the scale-plate 1 will have pulled down the arm 10 by the extension of the pair of springs 8 to a degree commensurate to the weight of the person, and the weight of the person will be registered on the dial 3 by the rotation of the pinion 43 by the rack 42 on the plate 11, such registration of the weight being prevented previous to the release of the rack 38. Simultaneously with the release of the rack 38 the arm 65 presses against the edge of the recess 67 in the plate 66 and forces it away from the piston-rod 51 and out of the notch 53, said arm 65 being impelled thereto by its connection with the lever 79 under the tension of the spring 78 on lever 79. The lung-tester now being free for use, pneumatic pressure introduced through the mouthpiece 57 causes the piston 50 to rise with the piston-rod 51, and this causes the spring 75 to pull the plate 66 upward out of engagement with the pin 71, while the spring 77 assists said plate 66 to seat itself in the notch 53 again, locking the lung-tester against use until another coin is inserted at the slot 18. When the weight is removed from the scale-plate 1, the springs 8 return the plate 11 to its normal position by same being pushed upwardly by the arm 10 on the first rebound of the springs 8; but the plate 11 is prevented from going too far by the looped wire 12 catching on the arm 9$^a$ and also by the tongue 82, located above same, said tongue 82 being adjustable by the set-screw 83 passing through the eyelet 84 and made resilient by the spring 85, said plate 11 carrying the pin 86, which strikes against the tongue 82.

Having thus described my said invention, what I claim, and desire to secure by Letters Patent, is—

1. In combination with a scale and lung-tester each embodying a vertically-movable element and indicating mechanism, means for retaining said lung-tester in locked position, a pivoted element having a plurality of arms at its upper end, one of said arms engaging said scale element, a spring-retracted pivoted element composed of two arms one for engagement with said locking means of the lung-tester, and means on the scale element for engagement with the other arm to normally support the first-named one out of engagement with said locking means of the lung-tester.

2. In combination with a scale and lung-tester, and indicating mechanism for each, a slidable element for retaining said lung-tester mechanism in locked position, a vertically-movable element for operating said scale indicating mechanism, and means for engaging said slidable element normally supported by said vertically-movable element out of engagement therewith to disengage said first-named slidable element and unlock said lung-tester mechanism.

3. In combination with a scale having indicating mechanism, and a lung-tester embodying indicating mechanism and a notched piston-rod, a spring-held slidable element to engage in said notch of the piston-rod, a vertically-movable element for actuating said scale indicating mechanism, and spring-pressed means to engage said slidable element and actuate the same from engagement with said piston-rod, said means being normally supported by said vertically-movable element out of engagement with said slidable element.

4. In combination with the scale and lung-tester each embodying a vertically-movable element and indicating mechanism, means for locking said lung-tester element against movement, means normally supported by said scale element to engage said locking means and release said lung-tester element when said scale element is operated, and means for engaging said scale element to retain the same in locked position.

5. In combination with a scale and a lung-tester each embodying a vertically-movable element and indicating mechanism, spring-pressed slidable means for normally engaging said lung-tester element to retain the same in locked position, spring-pressed means normally supported by said scale element out of engagement with said lung-tester-locking means, and released to engage said lung-tester-locking means when said scale element is released.

6. In combination with a scale and a lung-tester, each embodying a vertically-movable element and indicating mechanism, means for retaining said scale element in locked position, means for retaining said lung-tester element in locked position, means for engagement with said last-named means to actuate the same to unlock said lung-tester, normally supported out of engagement therewith by said scale element, and a lever engaging said means for retaining the scale element in locked position to actuate the same to unlock the scale element and thereby allow said scale element to release said locking means of the lung-tester.

7. In combination with a scale embodying a vertically-slidable toothed element, with indicating mechanism operated thereby, and a lung-tester embodying a notched piston-rod and indicating mechanism operated thereby, a spring-pressed double-armed element one of the arms of which is in engagement with said toothed element, a lever for engagement with the other of said arms to operate the first-named arm thereof out of engagement with said notched element, a spring-pressed plate slidable into and out of engagement with said notched piston-rod, a spring-pressed arm for engagement with said plate, and a stud carried by said toothed element to engage said last-named arm and normally sustain the same out of engagement with said plate.

8. In combination with the scale embodying a vertically-movable element and the lung-tester embodying a notched vertically-movable element, indicating mechanisms operated by said elements, a slidable spring-held element to engage the notched element to lock the same, a pivoted double-armed spring-held element having one of its arms engaging said vertically-movable scale element, a lever for engaging the other arm of said element, a spring-held arm to engage said slidable element, and a pin carried by said vertically-movable scale element to engage said spring-held arm and normally hold said arm out of engagement with said slidable element.

9. In combination with a scale and a lung-tester and indicating mechanism for each, means actuated by the scale mechanism for preventing or allowing movement of said scale indicating mechanism, means for retaining such lung-tester and its indicating mechanism positively locked, means for releasing said preventing mechanism, and means operated by and at the inception of the movement of said scale-actuated preventing mechanism to release said lung-tester and its indicating mechanism.

10. In combination with a scale and lung-tester, and indicating mechanism for each, means normally supported by the scale mechanism in elevated and inoperative position whereby said lung-tester mechanism is retained in locked position and released to unlock said lung-tester mechanism when said scale mechanism is operated.

11. In combination with a scale and lung-tester, and indicating mechanism for each, means for controlling the lung-tester indicating mechanism to hold the same in locked position, and means dependent on, and released at the inception of the initial movement of, said scale mechanism to unlock the lung-tester and the indicating mechanism thereof.

12. In combination with a scale and lung-tester and indicating mechanism for each, means whereby said lung-tester indicating mechanism may be held in locked and unlocked position, means whereby said scale indicating mechanism may be held in locked and unlocked position, and means whereby at the inception of movement of said scale mechanism said means for holding the lung-tester and its indicating mechanism is automatically released.

13. In combination with a scale and lung-tester, and indicating mechanism for each, means for retaining said lung-tester mechanism in locked position, a vertically-movable element for operating said scale-indicating mechanism, and means supported by said element normally in inoperative position for engagement with said locking means to release said locking means at the inception of the movement of said element during the weighing operation.

14. In combination with a scale and lung-tester, and indicating mechanism for each, means to independently operate said indicating mechanisms, and a connection between said means whereby said lung-tester mechanism is released at the inception of initial movement of the scale mechanism.

15. In combination with a scale and lung-tester, and indicating mechanism for each, means to independently operate said indicating mechanisms, and means engaged by said scale indicating operating means and normally held thereby in elevated and inoperative position out of engagement with said lung-tester-operating means to be actuated at the inception of movement of said scale indicating operating means to release said lung-tester and the indicating mechanism thereof.

16. In combination with a scale and lung-tester and indicating mechanism for each, means for controlling the locked position of said lung-tester and the indicating mechanism thereof, means for controlling the locked position of said scale and the indicating mechanism thereof, and means for releasing said scale-controlling means in advance of said lung-tester and the indicating mechanism thereof.

In testimony whereof I have affixed my signature in presence of two witnesses.

EMIL A. BARTEZKI.

Witnesses:
M. E. LETCHER,
GLADYS WALTON.